United States Patent Office 3,132,925
Patented May 12, 1964

3,132,925
METHOD FOR PRODUCTION OF SULFURYL FLUORIDE
Harry A. Pacini, Richmond, and Attila E. Pavlath, Berkeley, Calif., assignors to Stauffer Chemical Company, New York, N.Y., a corporation of Delaware
No Drawing. Filed Feb. 16, 1962, Ser. No. 173,812
1 Claim. (Cl. 23—203)

This invention relates to a process for the preparation of sulfuryl fluoride. More particularly, the process of the present invention involves reacting sulfur trioxide with calcium fluoride at elevated temperatures to obtain sulfuryl fluoride.

Among the prior art processes for producing sulfuryl fluoride, pyrolysis of strontium or barium fluorosulfonates is known as well as thermal decomposition of pyrosulfuryl fluoride. Another known method of producing sulfuryl fluoride is the reaction of sulfuryl chloride with potassium fluoride at elevated temperatures. However, these methods of the prior art are either costly, produce low yield, or entail the isolation of an intermediate.

The present invention on the other hand has the decided advantages of yielding the desired sulfuryl chloride in a continuous one-step operation in high yields using low cost easily accessible starting materials.

The present invention consists of reacting sulfur trioxide with calcium fluoride at temperatures between approximately 300° C. and 600° C. Any means for effecting contacting of the reactants within the temperature range stated may be used. As shown in the examples which follow, the sulfur trioxide may be passed through a heated tube containing calcium fluoride. A fluidized bed reactor may also be used for the present reaction or numerous other reactors which are obvious to those skilled in the art.

Example I

A tube of Hastelloy C was charged with 85 g. of calcium fluoride pellets and placed in a split furnace. The tube was heated to 300° C. and the sulfur trioxide was introduced in the vapor phase by means of bubbling nitrogen gas through 65% oleum at 80° C. A contact time of 24 seconds was used. The exit of the tube was adapted to accommodate a liquid nitrogen trap. At the end of 30 minutes there was obtained in the liquid nitrogen trap 1.2 parts of volatile material. Infrared analysis showed it to be .06 part $SO_2F_2$, .96 part $SiF_4$, 18 parts $SO_2$.

Example II

The procedure and equipment described above was used. $SO_3$ from 65% oleum was passed through the heat tube of calcium fluoride pellets in a nitrogen stream with a contact time of 12 sec. The calcium fluoride was heated to 400° C. After 45 minutes 2.0 parts of a gaseous product was obtained in the liquid nitrogen trap. Infrared analysis showed it to consist mainly of sulfuryl fluoride by 1.2 parts $SO_2F_2$, .4 part $SiF_4$ and .4 part $SO_2$.

Example III

The procedure and apparatus previously described was used. The tube was heated to 500° C. and a contact time of 15 seconds was used. After 3 hours 20 parts of a volatile material was collected in the liquid nitrogen trap. Infrared analysis showed that this product consisted mainly of sulfuryl fluoride. The molar ratio of sulfuryl fluoride to silicon tetrafluoride was 8:2.

Example IV

The procedure and apparatus previously described was used in this experiment. The Hastelloy C tube was packed with pelletized $CaF_2$ and heated to 600° C. The $SO_3$ was introduced using a nitrogen flow so that the contact time was 15 seconds. After 2 hours 10 parts of a gaseous material was obtained in the liquid nierogen trap. Infrared analysis showed this product to consist of 8.5 parts sulfuryl fluoride and 1 part silicon tetrafluoride and .5 part sulfur dioxide.

As can be seen from the above examples, silicon tetrafluoride appeared in the product. This material was produced by fluorine attack on the glassware used with the "Hastelloy C" reactor tube, i.e., liquid nitrogen trap and glass connections. The binder used in the calcium fluoride pellets also contained silicon which was possibly a further source of silicon tetrafluoride. Thus, the conversion to sulfuryl fluoride effected by the present invention could be further increased in a commercial operation wherein the reactor would have no glass components and a binder other than silicon-containing binders would be used.

Many variations in the present invention are obvious to those skilled in the art and should be considered within the scope of the present invention. For example, a single reactor might be used to oxidize $SO_2$ to $SO_3$ and immediately convert the $SO_3$ thus formed to sulfuryl fluoride. For this and other such reasons the invention should be limited only by the scope of the appended claim.

We claim:

A process for the production of sulfuryl fluoride, $SO_2F_2$, comprising passing gaseous sulfur trioxide through a reaction zone containing calcium fluoride at a flow rate which effects a retention time of approximately 12 to 24 seconds, said reaction zone being maintained at temperatures between approximately 300° C. and 600° C. and collecting the sulfuryl fluoride thus formed.

References Cited in the file of this patent
UNITED STATES PATENTS

| | | |
|---|---|---|
| 2,801,904 | Muetterties | Aug. 6, 1957 |
| 2,879,138 | Muetterties | Mar. 24, 1959 |